(12) United States Patent
Cai et al.

(10) Patent No.: US 9,832,162 B2
(45) Date of Patent: *Nov. 28, 2017

(54) VIRAL INVITATIONS FOR SOCIAL NETWORKS

(71) Applicant: LinkedIn Corporation, Mountain View, CA (US)

(72) Inventors: Haiying Cai, Palo Alto, CA (US); Hui Li, San Jose, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,207

(22) Filed: Aug. 15, 2016

(65) Prior Publication Data
US 2016/0359792 A1    Dec. 8, 2016

Related U.S. Application Data

(63) Continuation of application No. 14/266,647, filed on Apr. 30, 2014, now Pat. No. 9,419,818.

(51) Int. Cl.
*H04L 12/58* (2006.01)
*H04L 29/08* (2006.01)
*H04L 29/06* (2006.01)
*H04W 4/20* (2009.01)

(52) U.S. Cl.
CPC .............. *H04L 51/32* (2013.01); *H04L 29/06* (2013.01); *H04L 29/08* (2013.01); *H04L 51/24* (2013.01); *H04L 65/1066* (2013.01); *H04L 65/403* (2013.01); *H04L 67/02* (2013.01);
(Continued)

(58) Field of Classification Search
CPC ...... H04L 51/32; H04L 65/403; H04L 67/306
See application file for complete search history.

(56) References Cited

U.S. PATENT DOCUMENTS 9,419,818 B2    8/2016  Cai et al.
2012/0004956 A1*  1/2012  Huston .............. G06Q 30/0207
                                                        705/14.1
(Continued)

OTHER PUBLICATIONS

"U.S. Appl. No. 14/266,647, Non Final Office Action dated Dec. 18, 2015", 6 pgs.
(Continued)

*Primary Examiner* — Kim T Nguyen
(74) *Attorney, Agent, or Firm* — Schwegman Lundberg & Woessner, P.A.

(57) ABSTRACT

A system and method for virally growing a social network. The social network system receives a member account sign-up message for a first social network from a first member. The social network system then posts a member sign-up notification to the first member's event wall on a second social network; wherein the first member has one or more social contacts through the second social network. For at least a second respective member in the one or more social contacts, the social network system posts a personalized invitation message as a comment to the member sign-up notification on the first member's event wall, wherein the comment is initially hidden from all members other than the second respective member of the one or more member contacts.

20 Claims, 12 Drawing Sheets

(52) U.S. Cl.
CPC ............ *H04L 67/10* (2013.01); *H04L 67/306* (2013.01); *H04W 4/206* (2013.01)

(56) References Cited

U.S. PATENT DOCUMENTS

2015/0163258 A1\* 6/2015 Garcia, III .............. H04L 67/24
709/204
2015/0319125 A1 11/2015 Cai et al.

OTHER PUBLICATIONS

"U.S. Appl. No. 14/266,647, Notice of Allowance dated Apr. 13, 2016", 5 pgs.
"U.S. Appl. No. 14/266,647, Response filed Mar. 18, 2016 to Non Final Office Action dated Dec. 18, 2015", 9 pgs.

\* cited by examiner

FIGURE 4 http://www.thesecondsocialnetwork.com/

WELCOME, John Smith

| Overview | Profile | Follower Statistics | Page Statistics | Insights |

Share an update...

Attach a Link   Share With: All Followers

SHARE

All Updates

John Smith has joined a first social network. Congratulate him!
Like  Comments(2)  Share @prospectivemember1 Join John Smith on the first social network Link @prospectivemember2 Join John Smith on the first social network Link

Lowell Terry is now connected to Rory Walker
Like  Comment  Share

John Kelepouris is now connected to Brad Perry
Like  Comment  Share

Shawn Fraser shared a link:

PEOPLE YOU MAY KNOW

Sarah Dargatz
CEO, Gadgets, Inc.

Derrick Tedrick
Regional Manager
Widgets, Inc.

Seth Whitmer
Software Engineer
SBM

MEMBER PROFILE VIEWS

15  Your profile has been viewed by 15 people in the last 7 days

37  You have appeared in search results 37 times in the last 3 days

Your Network

289  Your 289 connections link you to 5,000,000+ members.

Second Social Network
Social Graph

First Social Network Social Graph

Augmented First Social
Network Social Graph

VIRAL INVITATIONS FOR SOCIAL NETWORKS

TECHNICAL FIELD

The disclosed implementations relate generally to the field of social networks, and in particular to a system for rapidly growing a social networking system.

BACKGROUND

The rise of the computer age has resulted in increased access to personalized services online. As the cost of electronics and networking services drop, many services that were previously provided in person are now provided remotely over the Internet. For example, entertainment has increasingly shifted to the online space with companies such as Netflix and Amazon streaming TV shows and movies to members at home. Similarly, electronic mail (e-mail) has reduced the need for letters to physically be delivered. Instead, messages are sent over networked systems almost instantly. Similarly, online social networking sites allow members to build and maintain personal and business relationships in a much more comprehensive and manageable manner.

Consequently, the number of different social networks and the amount which they are used in every facet of daily life has increased significantly. These social networks collect and organize data about their members' social lives and then are able to track the social graphs (e.g., social connections amongst members) for large groups of members. Generally, social networks with more members and more social data provide more benefits to their members than social networks with fewer members and less data. Thus, established social networks typically have more members and social graph data that can potentially make them more useful than newly created competitor social networks.

DESCRIPTION OF THE DRAWINGS

Some implementations are illustrated by way of example and not limitation in the figures of the accompanying drawings, in which:

FIG. 4 is a member interface diagram illustrating an example of a member interface 400 or web page having a personalized data feed (or content stream) via which a member of a social network service receives messages, status updates, notifications, and recommendations, according to some implementations.

FIG. 5 is a member interface diagram illustrating an example of a member interface 400 or web page, similar to that shown in FIG. 4, having a personalized data feed (or content stream) via which a member of a social network service receives messages, status updates, notifications, and recommendations, according to some implementations.

FIG. 6 is a member interface diagram illustrating an example of a member interface 600 or web page, similar to that shown in FIG. 4, having a personalized data feed (or content stream) via which a member of a social network service receives messages, status updates, notifications, and recommendations, according to some implementations.

Like reference numerals refer to corresponding parts throughout the drawings.

DETAILED DESCRIPTION

Figure 1:
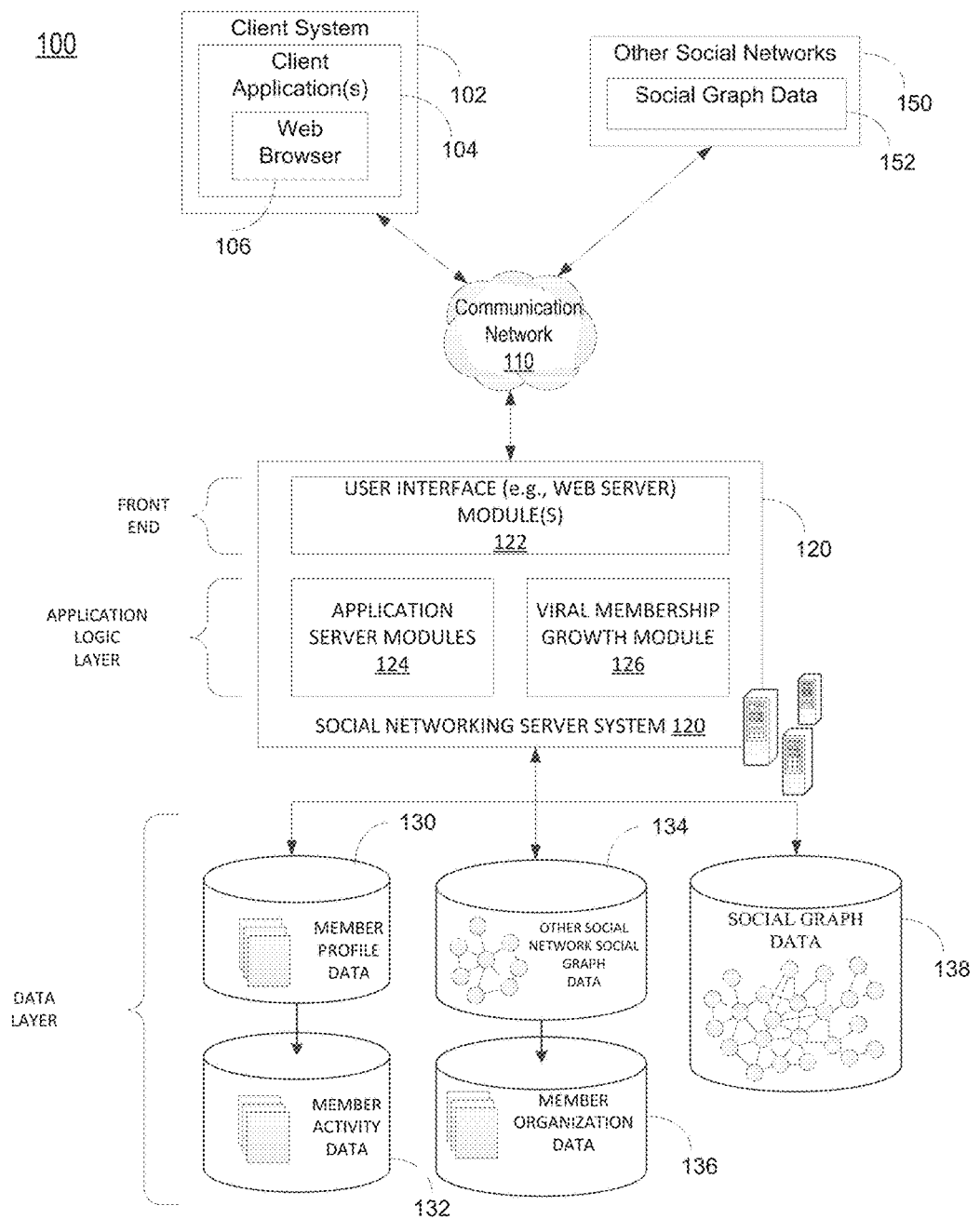
FIG. 1 is a network diagram depicting a client-server system 100 that includes various functional components of a social network server system 120 in accordance with some implementations.

The present disclosure describes methods, systems and computer program products for virally growing a social network in an environment with an existing social network. In the following description, for purposes of explanation, numerous specific details are set forth to provide a thorough understanding of the various aspects of different implementations. It will be evident, however, to one skilled in the art, that the any particular implementation may be practiced without all of the specific details and/or with variations permutations and combinations of the various features and elements described herein.

Social networks collect and organize data about their member's social lives and then are able to track the social graphs (e.g., social connections amongst members) for large groups of members. This data can then be used by the members to keep in touch with their contacts, share and receive news, interact with other members, find additional relationships, and generally extend the reach of their social lives. Thus social networks with more members and more social data provide more benefits to their members than social networks with fewer members and less data. Because of these additional benefits, established social networks typically have more members and social graph data that can potentially make them more useful than newly created social networks.

New or small social networks, therefore, need to grow their membership and social graph data as quickly as possible. One potential way to accomplish this is to leverage the social graph data in one or more already existing social networks. However, because social graph data is one of a social network's most valuable assets, each different social network may place restrictions on who can access that data and how it can be accessed.

It is therefore important that the first network take steps to ensure that the second social network is not unduly burdened as the first network accesses its social networking information and that the privacy of users is respected.

The privacy of members who use Internet based services is an increasingly important factor to consider. The present implementations protect the privacy of members in several ways. First, by importing social graph data from a second social network, the social network server system (FIG. 1, 120) avoids having to request direct member contact information (e.g., email address). This allows a new member to refer their friends without feeling that they are violating their friend's privacy. Secondly, private invitation messages are sent through personalized comments that are initially hidden. In this way, members cannot easily see who has and has not received an invitation from a new member. Lastly, the personalized invite is deleted, either when the link is clicked or when the invited member joins the first social network. In this way, it is unlikely that anyone other than the invited member will see the personalized invitations.

When a new member joins a first social network, that social network can determine whether that new member belongs to any other social networks. This information can be gathered from the new member as part of the sign-up process or submitted by the new member at some later point. If the new member is also a member of a second social network, the first social network then determines the data sharing policies of the second social network. Some social networks do not allow any data to be shared. In this case the first social network will not be able to import any data from the second social network into its own social data graph. Other social networks share direct contact information for the new member's social contacts. In this case the first social network can add all the social graph data from the second social network to its own social graph data and send direct invitations to the social contacts of the new member (e.g., via e-mail message).

When the first social network determines that the second social network only allows access to the in-network member identification information (e.g., member name/member ID internal to the second social network) of the new members social contacts, the first social network requests a list of social contacts for the new member from the second social network. In some cases, this request is made using the login or member identification received from the new member (e.g., the first social network requests a list of social contacts for Member A via logging into Member A's account and submitting the request on Member A's behalf). In other implementations the request can be made directly through an API provided by the second social network.

The first social network receives a list of social contacts for the new member from the second social network. The list only includes member identification that is internal to the second social network (e.g., information that can uniquely identify a member on the second social network but does not allow the first network to contact the member directly).

The first social network then posts a notification on the new member's event wall or activity feed (e.g., an area of a webpage that posts some or all of the updates relevant to the member) in the second social network. The event wall or activity feed is generally a web page generated by the second social network that includes information deemed to be relevant to the member for whom it is generated. Thus, when member A logs into the second social network, they are able to view a web page that includes the latest information related to their friends, family, causes, and any other information deemed relevant.

The notification is listed as having the new member as the author (e.g., a self-post) and thus may be displayed on the walls of his or her friends. For example, in some social networks when Member A posts a new status, that status is then shared with at least some of Member A's friends on an activity feed or event wall associated with each friend. However, an event from a company or an organization that appears on the activity feed of Member A is either unable, or much less likely, to appear on the activity feed of the social contacts of Member A. Thus, the first social network obtains Member A's permission to post the notification as a self-post to ensure that the notification post receives the maximum exposure to Member A's social contacts. The notification includes a link to the first social network.

The first social network also requests the new member to invite one or more social contacts from the list of their social contacts by sending the new member a list of their social contacts and inviting the new member to select one or more members from the displayed list (e.g., the first social network system displays a list of the new member's social contacts and requests the member selects one or more social contacts to receive invitations.) The first social network then records all the social contacts selected by the new member as potential members. The first social network then posts one comment to the notification message on the new member's event wall for each selected social contact. Each comment includes a link to a personalized member sign-up screen for the first social network. In some implementations all the comments to the notification are initially hidden from view and only accessible if a member chooses to view the comments directly (e.g., the member clicks on a button to unhide all the comments). Thus the second social network is not overwhelmed with personalized invites to the first social network. Additionally, the privacy of the members is also somewhat protected.

In some implementations, each comment includes the memberID of one of the selected social contacts and an address symbol (e.g., @membername1). In some implementations, including both the address symbol (e.g., the @ symbol) and the memberID ensures that the second social network treats the comment like a direct message to the potential member associated with the memberID. The comment is then directly displayed to the potential member associated with the memberID but not displayed to other members of the second social network.

The second social network can display the comment to the member associated with the member ID on that member's respective activity feed or send the comment as a message through the second social network's internal messaging system (e.g., the personalized invitation will be displayed in a message area of the second social network). In this way, each invited social contact is guaranteed to see the personalized invitation to the first social network, but other members of the second social network do not see the personalized invites unless they specifically open the comments to the notification post. Thus' the first social network minimizes the number of messages and posts needed on the second social network to achieve viral growth in membership of the first social network.

In some implementations, the invited social contact (e.g., potential new member) can click on the personalized invitation link in the respective comment personalized for them. In response, the first social network sends the potential new member a personalized invitation page to register with the first social network. In some implementations, when a potential member selects the personalized invitation link, the first social network deletes the comment that includes their particular personalized invitation link. In other implementations, the first social network only deletes a comment when the invited social contact (e.g., a second member) joins the first social network.

In some implementations, when invited prospective member joins the first social network, the process of finding a list of their social contacts and inviting the social contacts to join the first social network occurs again, allowing viral growth of the first social network.

FIG. 1 is a network diagram depicting a client-server system 100 that includes various functional components of a social network server system 120 in accordance with some implementations. The client-server system 100 includes one or more client systems 102, a social networking server system 120, and one or more other social networks 150. One or more communications networks 110 interconnect these components. The communications network 110 may be any of a variety of network types, including local area networks (LAN), wide area networks (WAN), wireless networks, wired networks, the Internet, personal area networks (PAN), or a combination of such networks.

In some implementations a client system 102 is an electronic device, such as a personal computer, a laptop, a smartphone, a tablet, a mobile phone or any other electronic device capable of communication with a communication network 110. The client system 102 includes one or more client applications 104, which are executed by the client system 102. In some implementations, the client application(s) 104 includes one or more applications from the set consisting of search applications, communication applications, productivity applications, game applications, word processing applications, or any other useful applications. The client application(s) 104 include a web browser 106. The client system 102 uses the web browser 106 to communicate with the social networking server system 120 and displays information received from the social networking server system 120. In some implementations, the client system 102 includes an application specifically customized for communication with the social network server system (FIG. 1, 120) (e.g., a LinkedIn iPhone application).

In some implementations, the client system 102 sends a request to the social networking server system 120 for a webpage associated with the social networking server system (e.g., the client system 102 sends a request to the social networking server system 120 for an updated activity feed webpage). For example, a member of the client system 102 logs onto the social networking server system 120 and clicks to view updates to their personalized event list. In response, the client system 102 receives the updated event list (e.g., news items, recommendations, friend status updates) and displays them on the client system 102.

In some implementations, as shown in FIG. 1, the social network server system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various implementations have been omitted from FIG. 1. However, a skilled artisan will readily recognize that various additional functional modules and engines may be used with a social network server system 120, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the various implementations are by no means limited to this architecture.

As shown in FIG. 1, the front end consists of a user interface module (e.g., a web server) 122, which receives requests from various client systems 102, and communicates appropriate responses to the requesting client systems 102. For example, the user interface module(s) 122 may receive requests in the form of Hypertext Transport Protocol (HTTP) requests, or other web-based, application programming interface (API) requests. The client system 102 may be executing conventional web browser applications, or applications that have been developed for a specific platform to include any of a wide variety of mobile devices and operating systems.

As shown in FIG. 1, the data layer includes several databases, including databases for storing data for various entities of the social graph, including member profile data 130, members activity data 132 (e.g., data describing member interactions with the social network server system 120 or with other members throughout the social network system server 120, other social network social graph data 134, and member organization data 136 (e.g., data that described member groups and affiliations on the first social network server system 120). In some implementations, the social graph data structure is implemented with a social graph database 138, which is a particular type of database that uses graph structures with nodes, edges, and properties to represent and store data. Of course, with various alternative implementations, any number of other entities might be included in the social graph (e.g., companies, organizations, schools and universities, religious groups, non-profit organizations, and any other group), and as such, various other databases may be used to store data corresponding with other entities.

Consistent with some implementations, when a person initially registers to become a member of the social network service implemented by the social network server system 120, the person will be prompted to provide some personal information, such as his or her name, age (e.g., birth date), gender, interests, contact information, home town, address, educational background (e.g., schools, majors, etc.), current job title, job description, industry, employment history, skills, professional organizations, memberships in other social networks 150, and so on. This information is stored, for example, in the member profile database with reference number 130. In some implementations the new member is also prompted to provide a list of other social networks 150 the new member already belongs to. If the new member belongs to one or more other social networks 150, the social network server system 120 also prompts the member for their member names or other identifying information for the one or more other social networks 150 to which the new member belongs.

In some implementations, the member profile database 130 includes member activity data 132. In other implementations, the member activity database 132 is distinct from, but associated with, the member profile database 130. The member activity database 132 stores activity data for each member of the social network server system 120. Member activity data includes, but is not limited to, the dates and times the member logs onto or off of the system, information viewed by the member on the social networking server system 120 (e.g., pages associated with people, organizations, brands, and or companies, jobs listings), communications made with other members (posts or messages), and posts made by the member.

In some implementations, the social network server system (FIG. 1, 120) also stores some social graph data 138 requested and received from a different social network in the other network social graph database 134. The data may be stored temporarily as a new member adds social contacts to the social network server system 120.

The member organization database 136 also stores data related to organizations on the social network server system 120 and their members. Thus, members of the social network server system 120 may create groups of members (e.g., based on interests, family connections, schools, employers, etc.) for members to join.

Once registered, a member may invite other members, or be invited by other members, to connect via the social network service. A "connection" may include a bi-lateral agreement by the members, such that both members acknowledge the establishment of the connection. Similarly, with some implementations, a member may elect to "follow" another member. In contrast to establishing a "connection", the concept of "following" another member typically is a unilateral operation and, at least with some implementations, does not include acknowledgement or approval by the member that is being followed. When one member follows another, the member who is following may receive automatic notifications about various activities undertaken by the member being followed. In addition to following another member, a member may elect to follow a company, a topic, a conversation, or some other entity, which may or may not be included in the social graph. Various other types of relationships may exist between different entities and are represented in the social graph data 138.

The social network server system 120 may also temporarily store social graph data 138 received from a second social network when a new member joins the social network server system 120. This data is stored in the other social network social graph database 134.

The social network service may provide a broad range of other applications and services that allow members the opportunity to share and receive information, often customized to the interests of the member. For example, with some implementations, the social network service may include a photo sharing application that allows members to upload and share photos with other members. As such, at least with some implementations, a photograph may be a property or entity included within a social graph. With some implementations, members of a social network service may be able to self-organize into groups, or interest groups, organized around a subject matter or topic of interest. In some implementations, the data for a group may be stored in a database. When a member joins a group, his or her membership in the group will be reflected in both the member organization database 136 and the social graph data stored in the database with reference number 138.

With some implementations, members may subscribe to or join groups affiliated with one or more companies. For instance, with some implementations, members of the social network service may indicate an affiliation with a company at which they are employed, such that news and events pertaining to the company are automatically communicated to the members. With some implementations, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database with reference number 138.

In some implementations, the application logic layer includes various application server modules 124, which, in conjunction with the user interface module(s) 122, generates various member interfaces (e.g., web pages) with data retrieved from various data sources in the data layer. With some implementations, individual application server modules 124 are used to implement the functionality associated with various applications, services and features of the social network service. For instance, a messaging application, such as an email application, an instant messaging application, or some hybrid or variation of the two, may be implemented with one or more application server modules 124. Similarly, a search engine enabling members to search for and browse member profiles may be implemented with one or more application server modules 124. Of course, other applications or services that utilize the viral membership growth module 126 may be separately implemented in their own application server modules 124.

In addition to the various application server modules 124, the application logic layer includes the viral membership growth module 126. As illustrated in FIG. 1, with some implementations, the viral membership growth module 126 is implemented as a service that operates in conjunction with various application server modules 124. For instance, any number of individual application server modules 124 can invoke the functionality of the viral membership growth module 126 to include an application server module 124 associated with applications for growing the social network virally. However, with various alternative implementations, the viral membership growth module 126 may be implemented as its own application server module 124 such that it operates as a stand-alone application. With some implementations, the viral membership growth module 126 includes or has an associated publicly available application programming interface (API) that enables third-party applications to invoke the functionality of the viral membership growth module 126.

Generally, the viral membership growth module 126 assists new member of the social network server system 120 to invite social contacts they have though other social networks 150 to join the social network server system 120. To do this, the viral membership growth module 126 identifies a new member when they join the social network server system 120. The viral membership growth module 126 requests the new member to list one or more social networks to which they already belong. If the member identifies at least one other social network 150, the viral membership growth module 126 then requests the new member's permission to access their data on this other social network 150 (e.g., asks the member to provide a member name and to consent to the social network server system 120 accessing the social data stored at the other social network 150).

In some implementations, if the new member agrees, the social network server system 120 requests a list of the new member's social contacts from the other social network 150. Once the list of the new member's social contacts is received, the social network server system 120 requests that the new member select one or more members from the contact list to invite to join the social network server system 120. For example, the social network server system 120 sends a web page to the client device that lists one or more contacts. The new member the selects (e.g., clicks a check box) one or more of the listed contacts. The social network server system 120 then receives the one or more contacts selected by the member.

In some implementations, the social network server system 120 then creates a post announcing that the new member has joined the first social network. This announcement post is then posted to the first member's account on the second social network. For example, the announcement post is posted as a status update from the new member. The status update is then included on the event walls of the social contact of the new member on the second social network. In some implementations, the notification post includes a link to the first social network.

The social network server system 120 then generates personalized invitations for each member selected by the new member. In some implementations, each personalized invitation is posted as a comment to the notification post. These comments are initially hidden from view (e.g., the notification post does not show the comments unless a member requests to see them). A member may choose to view the comments (e.g., by clicking on the "comments" button or link.) In this way the personalized invitations are only shown to the intended invitee. In some implementations, each personalized invitation includes the member name of the specific invitee and a symbol that indicates that the invitation is directed to that member (e.g., @inviteeMemberName1). Each invitation also includes a personalized invitation link.

In some implementations, when a member clicks on a personalized invitation link, the social networking server system 120 sends a customized membership registration webpage (e.g., a membership registration screen that includes at least some details of the invitee (e.g., the potential member's name). In some implementations, when the potential member clicks on his or her associated personalized invitation link, the social networking server system 120 then deletes the comment including the personalized invitation. For example, if Member A selects Potential Member B to receive a personalized invitation, the social networking server system 120 then posts a comment that includes the member ID of Potential Member B. If Potential Member B then clicks on the customized invitation link, the server system then deletes the comment that includes the personalized invitation for Potential Member B. In other implementations, the social networking server system 120 only deletes the personalized invitation comment for Potential Member B when Potential Member B actually joins the first social network.

In some implementations one or more other social networks 150 (e.g., Facebook, Myspace, Google+, Weibo) are connected to the communication network 110. The social networking server system 120 can communicate with the one or more other social networks 150 via a communication module to request social data and access the social network APIs. Each social network also includes at least some social graph data 152.

Figure 2:
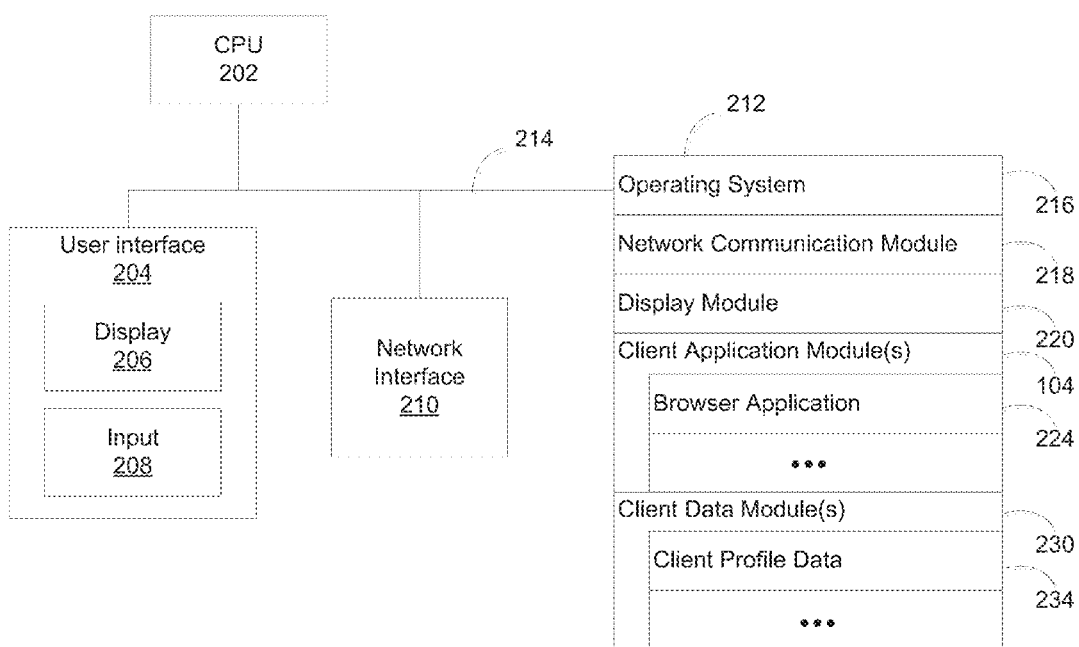
FIG. 2 is a block diagram illustrating a client system 102 in accordance with some implementations.

FIG. 2 is a block diagram illustrating a client system 102 in accordance with some implementations. The client system 102 typically includes one or more processing units (CPU's) 202, one or more network interfaces 210, memory 212, and one or more communication buses 214 for interconnecting these components. The client system 102 includes a user interface 204. The user interface 204 includes a display device 206 and optionally includes an input means such as a keyboard, mouse, a touch sensitive display, or other input buttons 208. Furthermore, some client systems 102 use a microphone and voice recognition to supplement or replace the keyboard.

Memory 212 includes high-speed random access memory, such as dynamic random-access memory (DRAM), static random access memory (SRAM), double data rate random access memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately, the non-volatile memory device(s) within memory 212, comprise(s) a non-transitory computer readable storage medium.

In some implementations, memory 212 or the computer readable storage medium of memory 212 stores the following programs, modules and data structures, or a subset thereof:
  an operating system 216 that includes procedures for handling various basic system services and for performing hardware dependent tasks;
  a network communication module 218 that is used for connecting the client system 102 to other computers via the one or more communication network interfaces 210 (wired or wireless) and one or more communication networks, such as the Internet, other wide area networks, local area networks, metropolitan area networks, etc.;
  a display module 220 for enabling the information generated by the operating system 216 and client applications 104 to be presented visually on the display 206;
  one or more client applications 104 for handling various aspects of interacting with the social network server system (FIG. 1, 120), including but not limited to:
    a browser application 224 for requesting information from the social networking server system 120 (e.g., product pages and member information) and receiving responses from the social networking server system 120; and
  a client data module 230, for storing data relevant to the clients, including but not limited to:
    client profile data 234 for storing profile data related to a member of the social network server system 120 associated with the client system 102.

Figure 3:
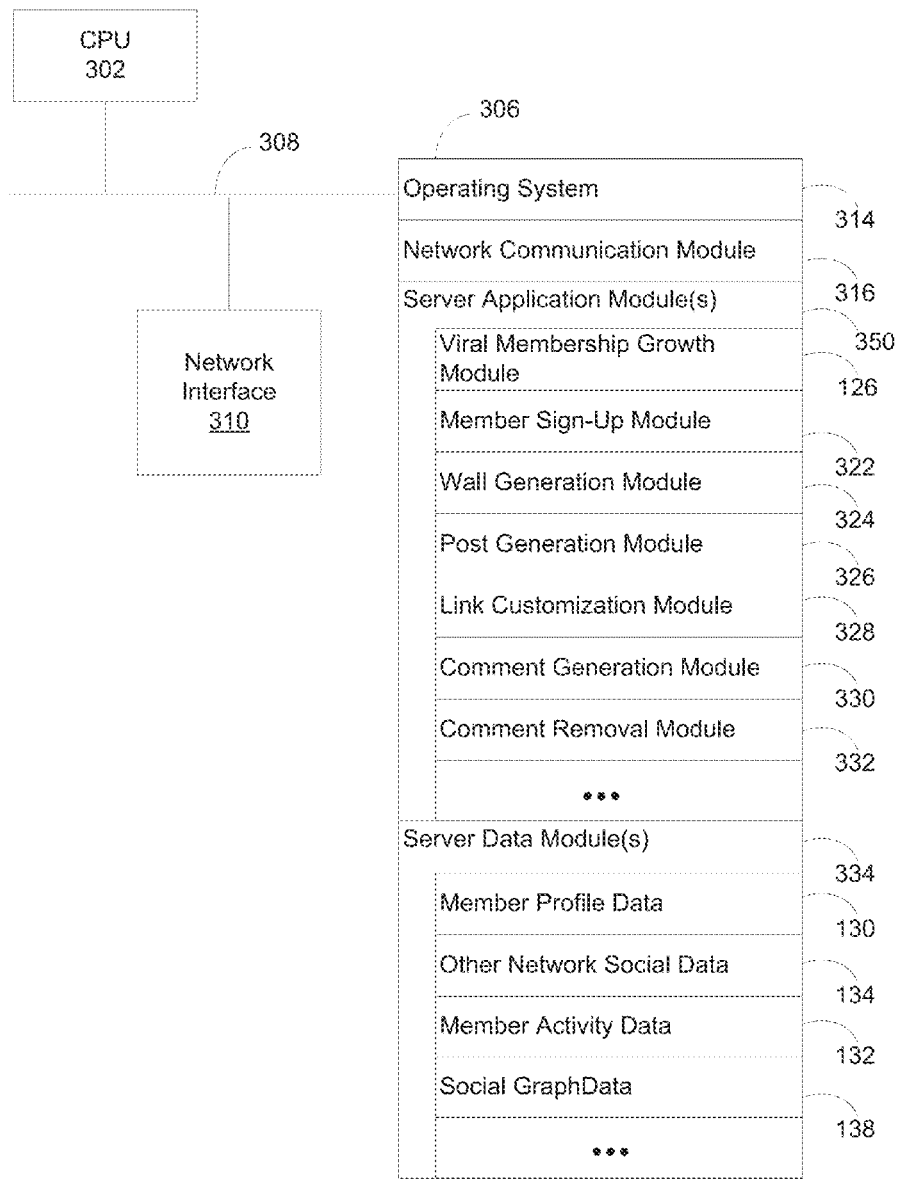
FIG. 3 is a block diagram illustrating a social network server system (FIG. 1, 120) in accordance with some implementations.

FIG. 3 is a block diagram illustrating a social network server system (FIG. 1, 120) in accordance with some implementations. The social network server system 120 typically includes one or more processing units (CPU's) 302, one or more network interfaces 310, memory 306, and one or more communication buses 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302.

Memory 306, or alternately the non-volatile memory device(s) within memory 306, comprises a non-transitory computer readable storage medium. In some implementations, memory 306 or the computer readable storage medium of memory 306 stores the following programs, modules and data structures, or a subset thereof:
  an operating system 314 that includes procedures for handling various basic system services and for performing hardware dependent tasks;
  a network communication module 316 that is used for connecting the social networking server system 120 to other computers via the one or more communication network interfaces 310 (wired or wireless) and one or more communication networks, such as the Internet, other wide area networks, local area networks, metropolitan area networks, and so on;

one or more server application modules 350 for performing the services offered by social network server system 120, including but not limited to:
- a viral membership growth module 126 for allowing new members of the social network server system 120 to invite their social contacts to the social network server system 120;
- a member sign-up module 322 for allowing a new member to join the social network server system 120 (e.g., providing a sign-up web page);
- a wall generation module 324 for generating an activity stream or event wall for one or more members of the social network server system 120;
- a post generation module 326 for generating posts (e.g., notification posts, personalized invite comments) that will be posted on member activity walls;
- a link customization module 328 for customizing invitation links for prospective new members of a social network based on the selections of an existing member of the social network;
- a comment generation module 330 for generating comments to existing posts that address a specific member or potential member; and
- a comment removal module 332 for removing personalized invitation comments when either the link has been clicked on or the invited potential member has joined the social network server system 120;

server data modules 334, holding data related to social network server system (FIG. 1, 120), including but not limited to:
- member profile data 130 including the person who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to other social networks 150, and so on;
- other social network social graph database 134 including social graph data requested and received from a social network outside the social network server system 120;
- member activity data 132 including data representing any interaction the member has with the social network server system 120, including but not limited to log on/ log off events, messages, invites, page views, etc.; and
- social graph data 138 including data that represents members of the server system and the social connections between them.

Figure 4:
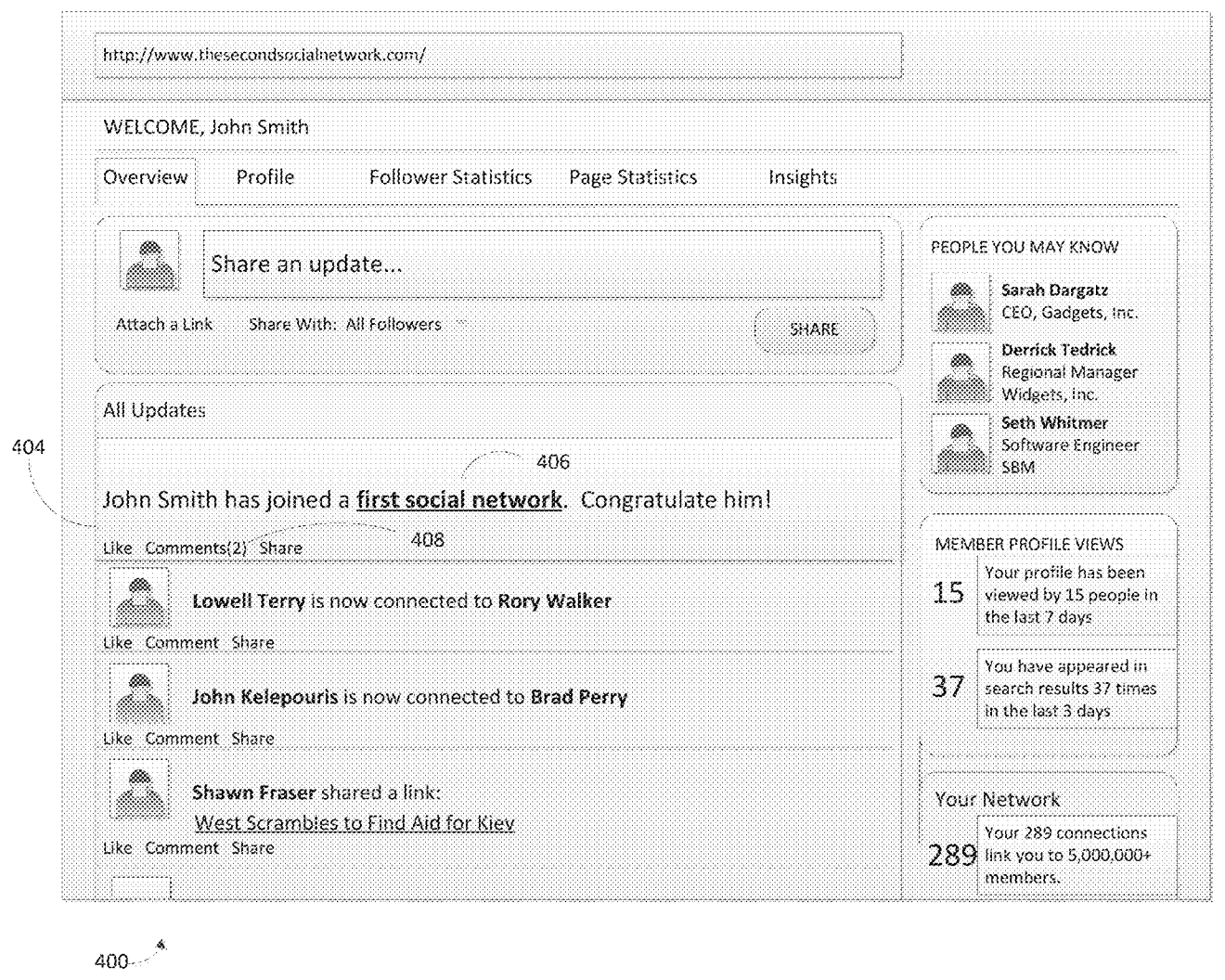

FIG. 4 is a member interface diagram illustrating an example of a member interface 400 or web page having a personalized data feed (or content stream) via which a member of a social network service receives messages, status updates, notifications, and recommendations, according to some implementations. In the example member interface of FIG. 4, the content module depicted represents a personalized data feed or content stream for a member of the social network service with the name John Smith. In this example, not only does the content stream present content selected specifically for John Smith, the content stream itself is presented within a member interface or web page that is personalized for John Smith. With some implementations, a personalized data feed or content stream has associated with it various configuration settings that enable the member to specifically filter or select the type of content the member desires to view in the personalized content stream. In this example, the message or status update with reference number 404 is a post related to John joining the first social network.

As shown in FIG. 4, the recommendation or status update with reference number 408 includes buttons or links that enable the viewing member to interact or engage with the recommendation. In particular, a button labelled "like" allows the member to upvote the suggestion or express a favorable opinion of the recommendation and the course it recommends. Similarly, a button labelled "share" allows the viewing member to share the recommendation or status update with another member of the social network service, for example, by re-publishing the recommendation to another member's personal data feed or content stream. Finally, a button labelled "comment" allows the member to comment on the recommendation or status update, for example, by entering some text that will be presented with the recommendation or status update and be visible in the personalized content streams of other members of the social network service. Clicking on the comment button will also display any currently hidden comments. In this case the comment button includes the number 2, indicating that two comments are currently hidden.

FIG. 4 shows a notification post 404 indicating that a first member (in this case John Smith) has joined another social network (e.g., the first social network). The notification post 404 includes a link to the first social network 406 and one or more comments 408 that are initially hidden from view.

FIG. 5 is a member interface diagram illustrating an example of a member interface 400 or web page, similar to that shown in FIG. 4, having a personalized data feed (or content stream) via which a member of a social network service receives messages, status updates, notifications, and recommendations, according to some implementations. In the example member interface of FIG. 5, a member has selected (e.g., clicked on) to display the hidden comments to notification post 404.

In some implementations, when the comments to a notification post 404 are displayed, one or more customized invite links for prospective members are displayed. The first customized invite comment 502-1 is addressed to prospectivemember1 using the @ symbol. The comment 502-1 also includes a link to a membership sign-up page, personalized to prospectivemember1. Similarly, the second customized invite comment 502-2 is addressed to prospectivemember2 using the @ symbol and also includes a link to a membership sign-up page, personalized to prospectivemember2.

Figure 6:
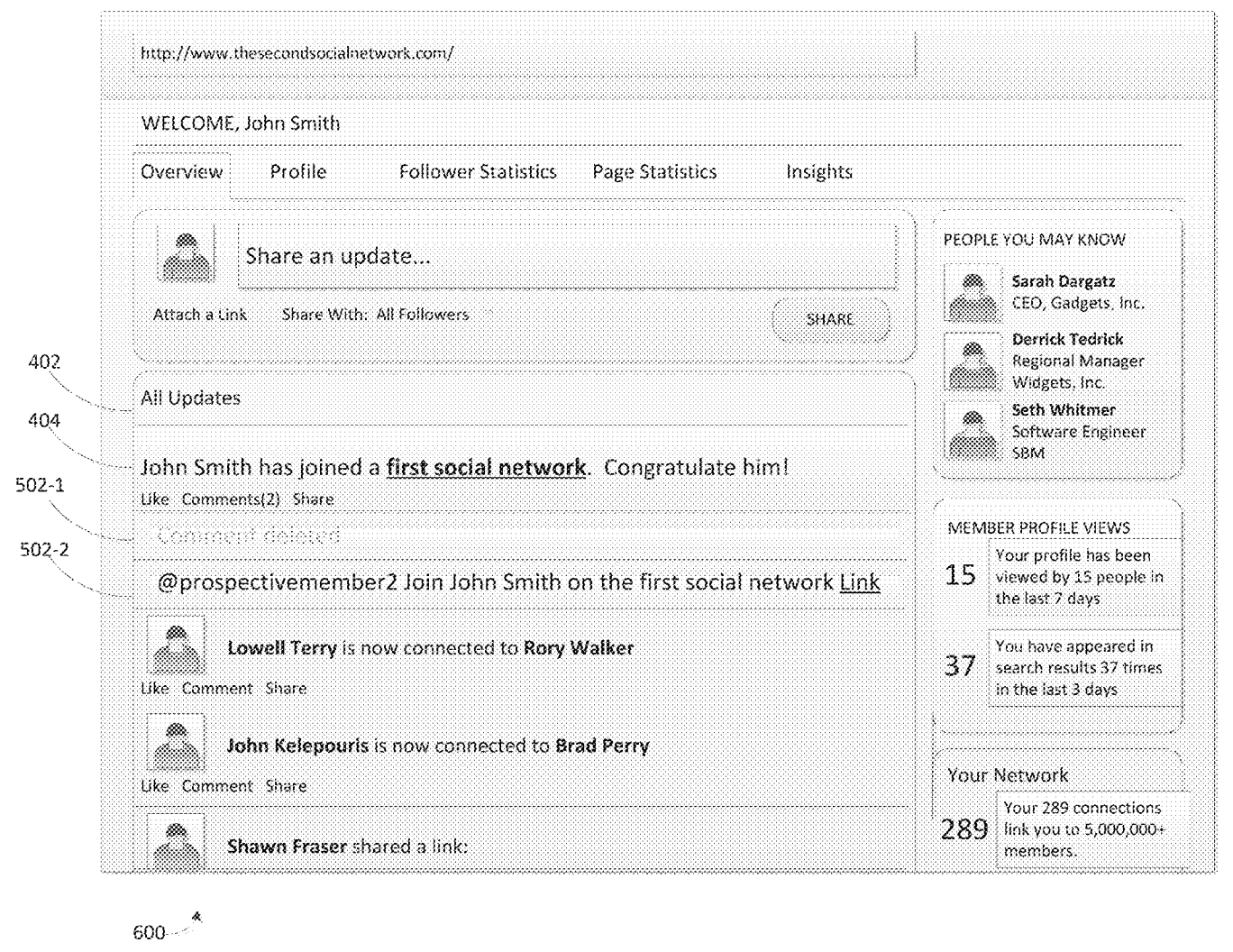

FIG. 6 is a member interface diagram illustrating an example of a member interface 600 or web page, similar to that shown in FIG. 4, having a personalized data feed (or content stream) via which a member of a social network service receives messages, status updates, notifications, and recommendations, according to some implementations. In the example member interface of FIG. 6, the first personalized comment 502-1 has been deleted. In some implementations a personalized invitation comment is deleted when the invited prospective member it addresses clicks on the link to the personalized sign-up page. In other implementations, a comment is only deleted when the prospective member has actually joined the social network server system 120.

Figure 7:
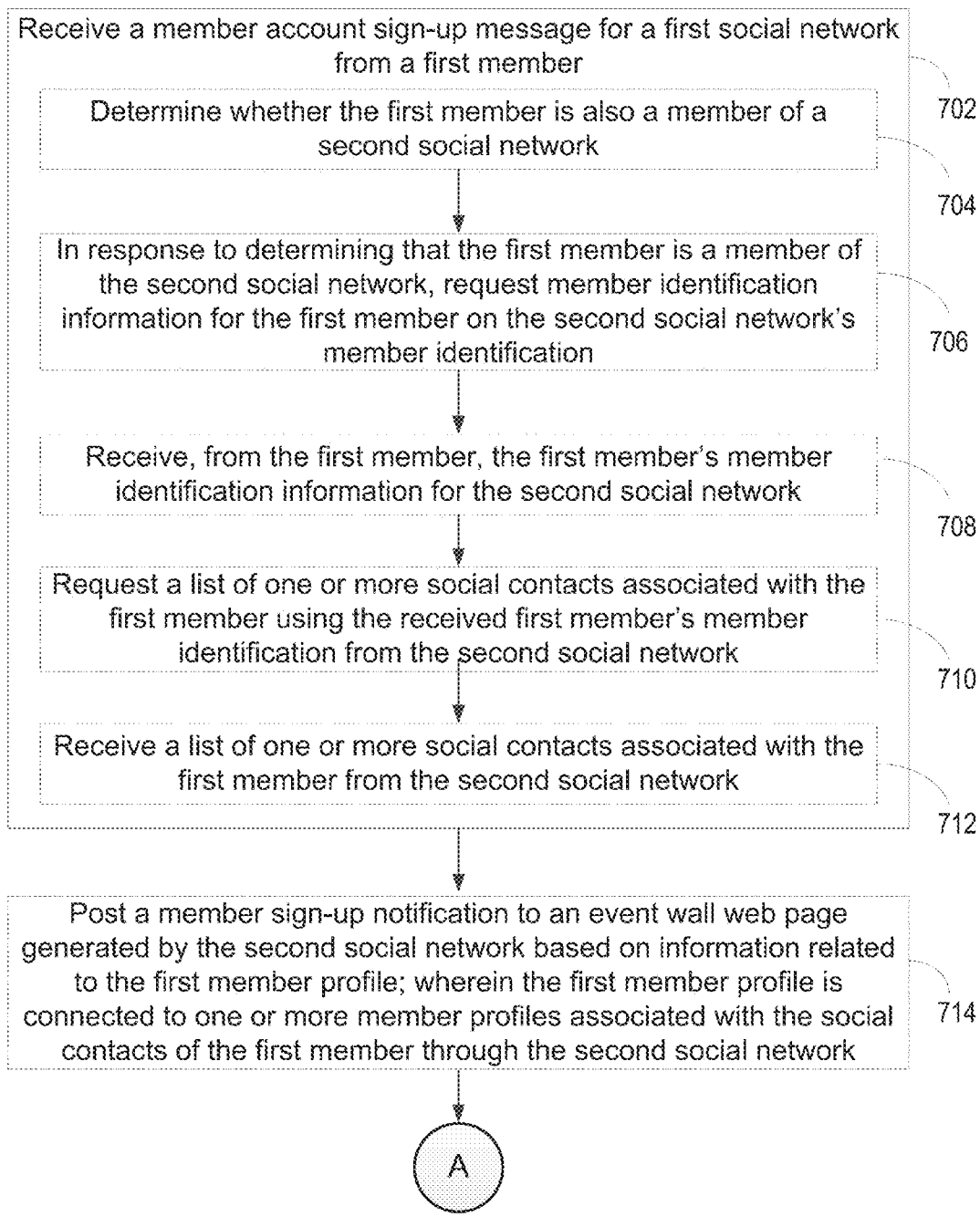
FIG. 7 is a flow diagram illustrating a process for virally growing membership of a social network in accordance with some implementations.

FIG. 7 is a flow diagram illustrating a process for virally growing membership of a social network in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the method described in FIG. 7 is performed by the social network server system (FIG. 1, 120).

In some implementations, the method is performed at a computer system including one or more processors and memory 306 storing one or more programs for execution by the one or more processors. In some implementations the computer system is associated with or hosts a first social network (e.g., social network server system (FIG. 1, 120)).

The social network server system (FIG. 1, 120) receives (702) a member account sign-up message for a first social network from a first member. For example, a new member goes to sign up page, enters the requested information and an account on the first social network is created. The request can be associated with a particular member profile from a second social network. If so, the member profile represents a first member of the second social network. For example, member A has a profile on the second social network. Member A then clicks on a link posted in the second social network that displays a sign-up page for the first social network. By clicking the link, Member A has also caused information about Member A's profile to be sent to the first social network.

The social network server system (FIG. 1, 120) determines (704) whether the first member is also a member of a second social network. For example, during the sign-up process the social network server system (FIG. 1, 120) requests that new member select other social networks 150 that the new member is already a member of In some implementations, a list of social networks is presented and the member selects one or more social networks. In other implementations, the new member can enter one or more social networks.

In response to determining that the first member is a member of the second social network, the social network server system (FIG. 1, 120) requests (706) member identification information for the first member on the second social network's member identification. This information is only given to the social network server system (FIG. 1, 120) if the member consents, and it is therefore completely optional. For example, the social network server system (FIG. 1, 120) asks the new member to enter their Facebook profile page. In other examples, the social network server system (FIG. 1, 120) asks for a member ID such as a twitter handle.

The social network server system (FIG. 1, 120) then receives (708) the first member's member identification information for the second social network from the first member. The social network server system (FIG. 1, 120) then requests (710) a list of one or more social contacts associated with the first member using the received first member's member identification from the second social network. For example, the second social network provides an API for requesting a list of all of the friends of the new member using that member's in-network member identification (e.g., login name or email address). In some implementations, based on the second social network's data sharing policies, the list of social contacts only includes the in-network identification for each of the social contacts. This allows social networks to protect their member's privacy by not giving out the member's direct contact information (e.g., email address).

In response to the request, the second social network provides at least some data related to the social contacts associated with the first member. Thus, the social network server system (FIG. 1, 120) receives (712) a list of one or more social contacts associated with the first member from the second social network.

The social network server system (FIG. 1, 120) then posts (714) a member sign-up notification to an event wall web page generated by the second social network based on information related to the first member profile; wherein the first member profile is connected to one or more member profiles associated with the social contacts of the first member through the second social (e.g., a self-post rather than a post from the first social network). In this way, the notification post 404 is visible on the event page of the new member on the second social network and may also be displayed on the event pages of the new member's social contacts.

Figure 8:
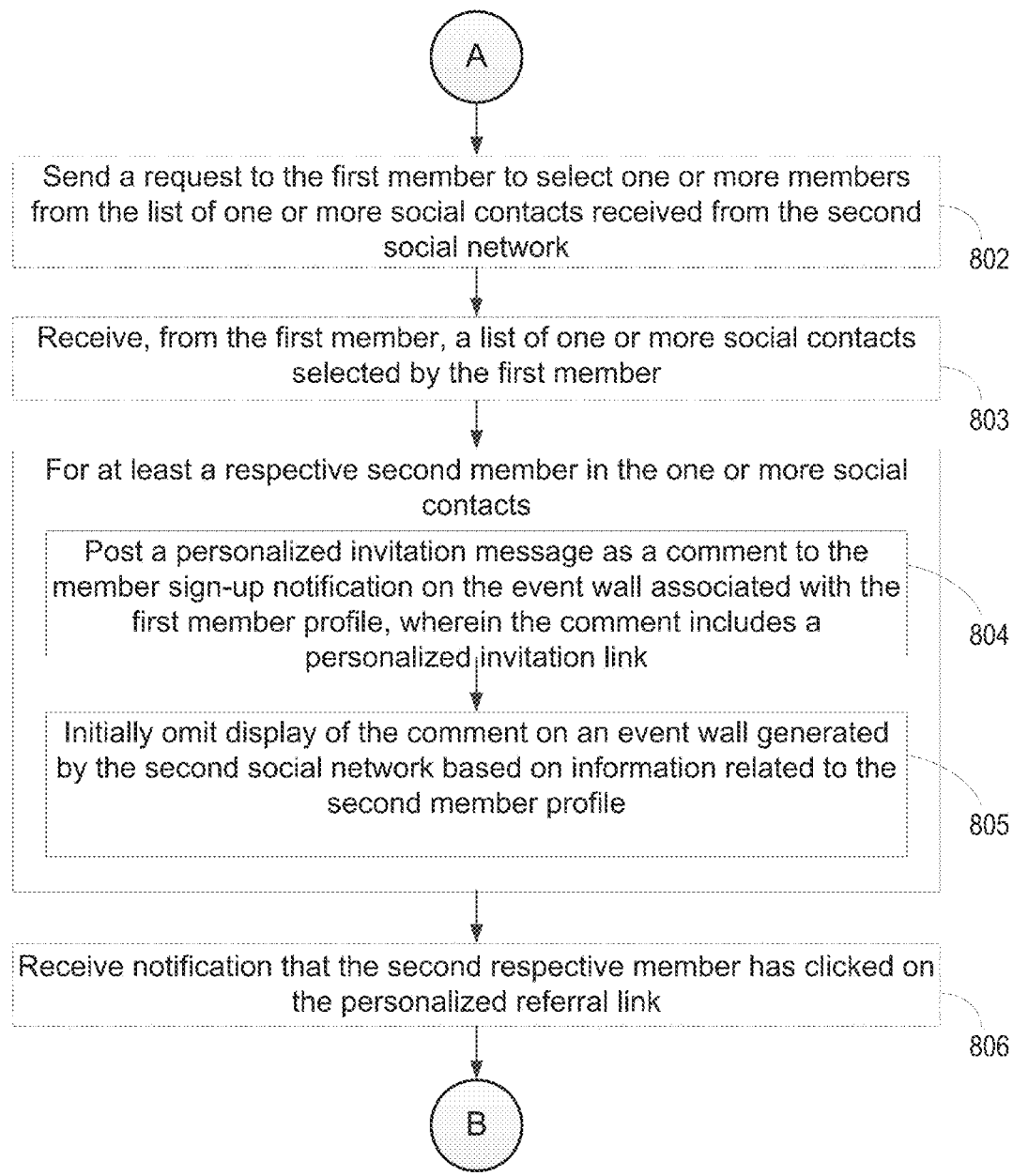
FIG. 8 is a flow diagram illustrating a process for virally growing membership of a social network in accordance with some implementations.

FIG. 8 is a flow diagram illustrating a process for virally growing membership of a social network in accordance with some implementations. Each of the operations shown in FIG. 8 may correspond to instructions stored in a computer memory or computer readable storage medium. Optional operations are indicated by dashed lines (e.g., boxes with dashed-line borders). In some implementations, the method described in FIG. 8 is performed by the social network server system (FIG. 1, 120).

In some implementations the social network server system (FIG. 1, 120) sends (802) a request to select one or more members from the list of one or more social contacts received from the second social network to the first member. For example, the social network server system (FIG. 1, 120) sends a web page that lists some or all of the new member's social contacts from the second social network and displays them with check boxes next to each name. The new member can then check or uncheck each name. Checking a check box associated with a particular social contact (e.g., by clicking on it) indicates that the new member wants to invite the associated social contact to the social network server system (FIG. 1, 120). In some implementations, the webpage defaults to "Select All" and in other implementations the webpage defaults to no one selected.

The social network server system (FIG. 1, 120) then receives (803) the selected one or more members from the first member. For example, after the new member has selected 20 social contacts from the displayed list of social contacts, the social network server system (FIG. 1, 120) receives a list of all 20 selected social contacts and their associated member identification information (for the second social network) from a client device associated with the new member.

For at least a second respective member in the one or more social contacts, the social network server system (FIG. 1, 120) posts (804) a personalized invitation message as a comment to the member sign-up notification on the first member's event wall, wherein the comment is initially hidden from all members other than the second respective member of the one or more member contacts. In some implementations, each personalized invitation message includes a personal referral link that includes embedded information that will automatically connect to the inviting member. For example, if new member A selects to invite prospective member B to the first social network, the personalized link will include metadata indicating the invite was from new member A. If prospective member B joins the first social network, the network will automatically list new member A as a social contact (e.g., friend).

The social network server system (FIG. 1, 120) initially omits (805) display of the comment on an event wall generated by the second social network based on information related to the second member profile. The comment is only viewed when a member specifically clicks on the comments button to reveal all comments.

In some implementations the second respective member is one of the members selected by the first member. Thus, only prospective members selected by the new member receive personalized invites through the new member. In some implementations, the social network server system (FIG. 1, 120) receives (806) receiving notification that the second respective member has clicked on the personalized referral link.

Figure 9:
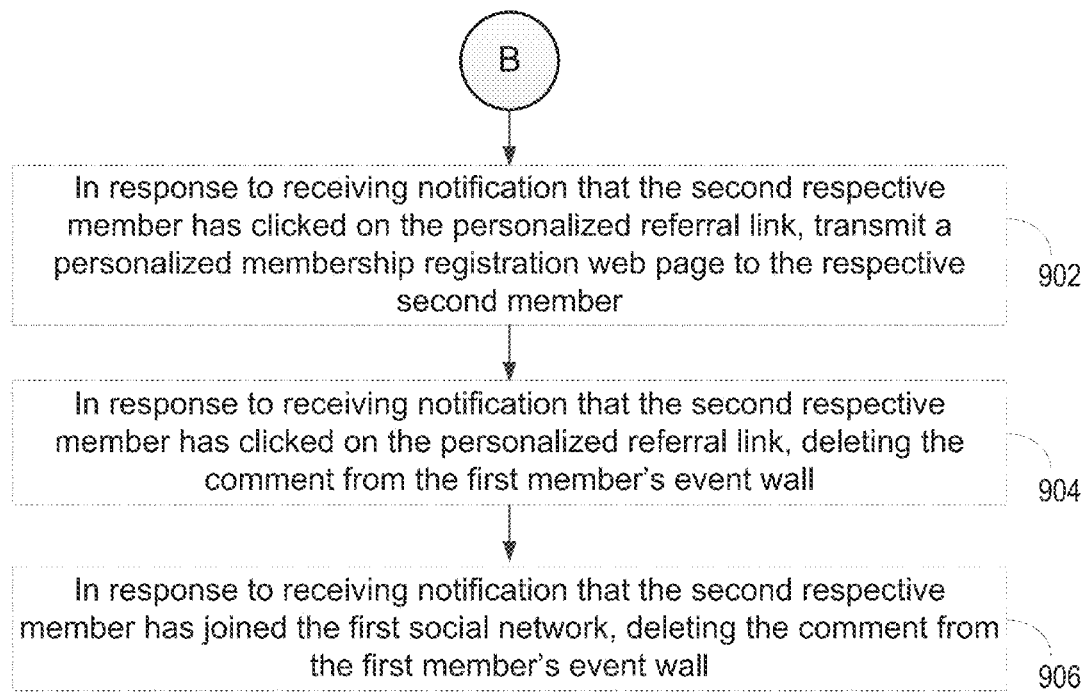
FIG. 9 is a flow diagram illustrating a process for virally growing membership of a social network in accordance with some implementations.

FIG. 9 is a flow diagram illustrating a process for virally growing membership of a social network in accordance with some implementations. Each of the operations shown in FIG. 9 may correspond to instructions stored in a computer memory or computer readable storage medium. Optional operations are indicated by dashed lines (e.g., boxes with dashed-line borders). In some implementations, the method described in FIG. 9 is performed by the social network server system (FIG. 1, 120).

In response to receiving notification that the second respective member has clicked on the personalized referral link, the social network server system (FIG. 1, 120) transmits (902) a personalized membership registration web page to the respective second member. For example, the personalized membership registration webpage includes the member's name and one or more potential social contacts (e.g., friends). This personalized membership registration page can be generated with information received from the new member.

In response to receiving notification that the second respective member has clicked on the personalized referral link, the social network server system (FIG. 1, 120) deletes (904) the comment from the first member's event wall. In other implementations, the social network server system (FIG. 1, 120) deletes (906) the comment from the first member's event wall, in response to receiving notification that the second respective member has joined the first social network.

Figure 10:
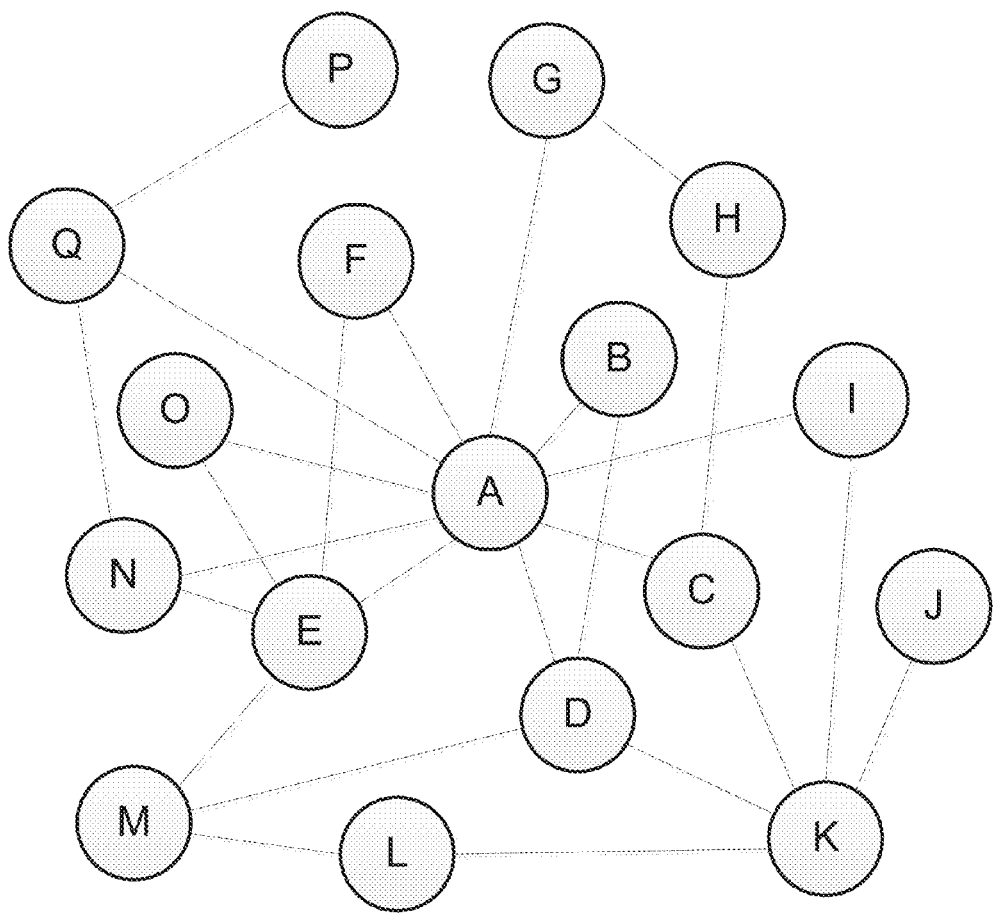
FIG. 10 is a diagram representing the social graph of a second social network in accordance with some implementations.

FIG. 10 is a block diagram representing the social graph of a second social network. The social graph has a plurality of nodes (A-Q). Each node represents a member of the social network. The lines between nodes (e.g., edges) represented confirmed associations or relationships between the represented members. For example, if node members are friends an edge will connect them. In some cases, an edge will be drawn if the one of the members follows (e.g., receives updates from or about) the other member. In yet other cases, an edge will be generated based on communication between the two nodes. The second social network social graph is relatively full, including a plurality of nodes and edges between the nodes.

Figure 11:
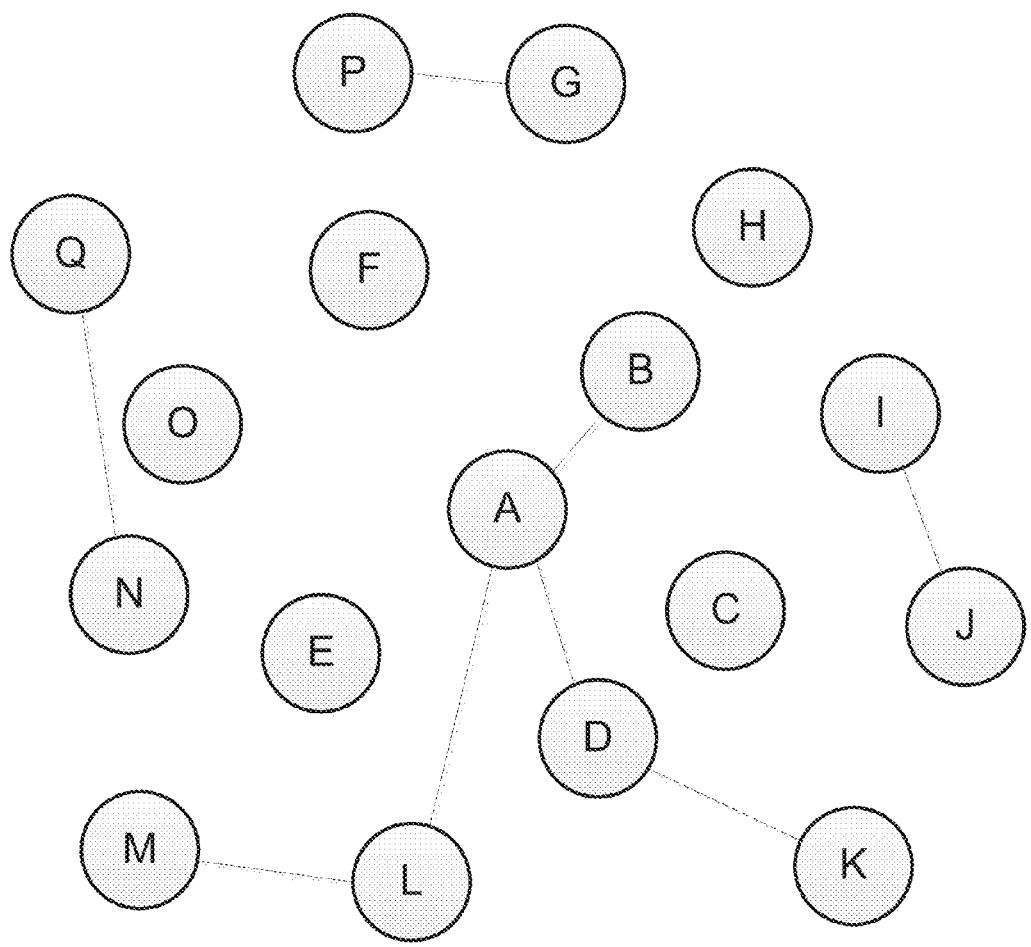
FIG. 11 is a diagram representing the social graph of a first social network in accordance with some implementations.

FIG. 11 is a block diagram representing the social graph of a first social network. It has the same node and edge structure as the social graph of FIG. 10. However, the first social network is newer than the second social network (or at least newer to these particular members). Member A (e.g., represented by node A) has recently joined the first social network. The first social network has limited information about Member A's social network (e.g., limited to the relationship with B, D, and L). The social graph also includes some information about other members (e.g., the edges between Q-N, M-L, D-K, and P-G).

To grow the social graph, the first social network requests social graph data about new member A from the second social network. If the second social network permits, a list of social contacts is obtained by the first social network.

Figure 12:
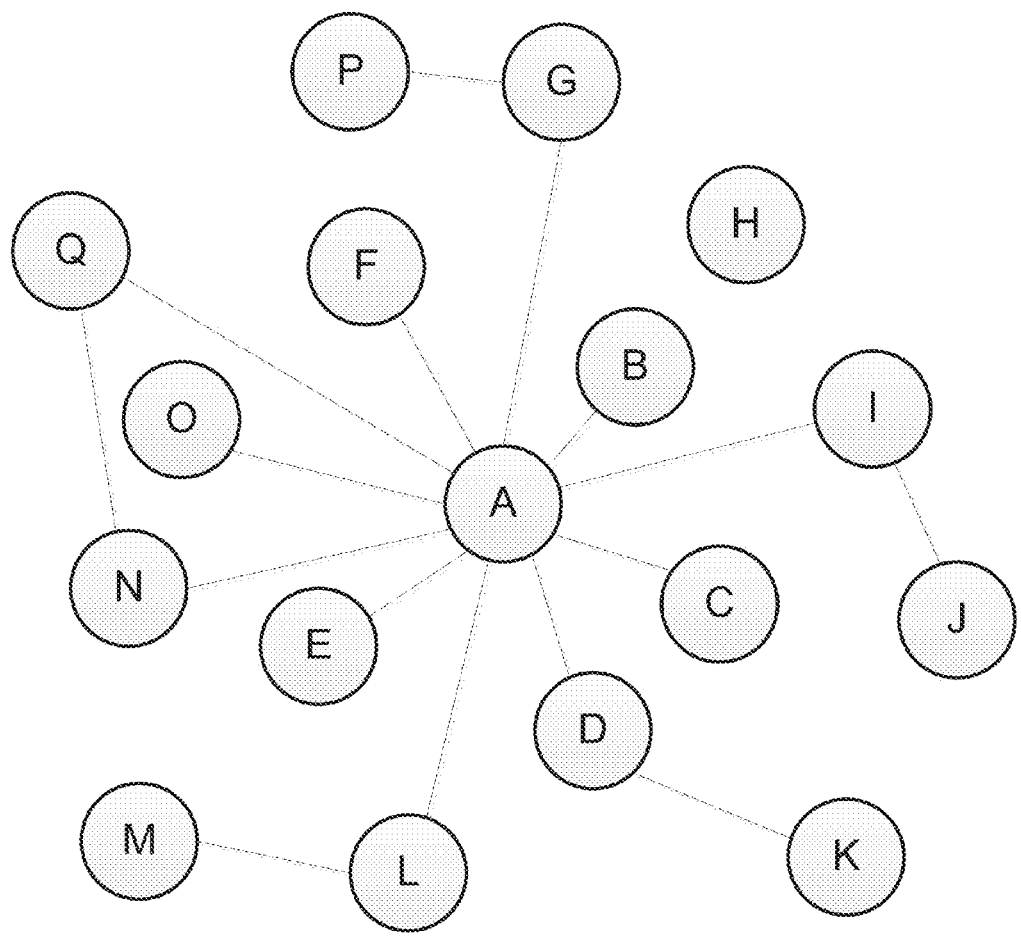
FIG. 12 is a diagram representing the augmented social graph of a first social network in accordance with some implementations.

FIG. 12 is a block diagram representing the augmented social graph of a first social network. It has the same node and edge structure as the social graph of FIGS. 10 and 11. The augmented social graph of the first social network is created by requesting a list of social contacts for new member A from the second social network. Once the list is received, the first social network can add the appropriate edges to the social graph.

As can be seen, only edges connected to new member A are added to the social graph. For example, A-E, A-N, A-O, A-Q, etc., were added. However, the I-K edge (as seen in FIG. 9) is not added, because only social contacts associated with new member A were received from the second social network. In some implementations, only members who confirm the relationship with new member A are added to the graph (e.g., the member is only added after accepting a fried request from Member A). In this way, the social graph data of the first social network can be augmented and the first social network can grow into a new area quickly. In some implementations, when invited prospective member joins the first social network, the process of finding a list of their social contacts and inviting the social contacts occurs again, allowing viral growth of the social network.

The foregoing description, for purpose of explanation, has been described with reference to specific implementations. However, the illustrative discussions above are not intended to be exhaustive or to limit the possible implementations to the precise forms disclosed. Many modifications and variations are possible in view of the above teachings. The implementations were chosen and described in order to best explain the principles involved and their practical applications, to thereby enable others skilled in the art to best utilize the various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A computer-implemented method comprising:
at a computer system including one or more computer processors and memory storing one or more programs for execution by the one or more computer processors:
receiving a member account sign-up request for a first social network, the request associated with a first member profile from a second social network, the first member profile representing a first member of the second social network;
posting a member sign-up notification to an event wall web page generated by the second social network based on information related to the first member profile, wherein the first member profile is connected to one or more member profiles associated with social contacts of the first member through the second social network; and
for at least a second respective member profile in the one or more member profiles associated with the social contacts of the first member:
posting a personalized invitation message as a comment to the member sign-up notification on the event wall web page associated with the first member profile, and
initially omitting display of the comment on the event wall web page generated by the second social network based on information related to the second respective member profile.

2. The method of claim 1, wherein receiving a member account sign-up request for a first social network includes:
determining whether the first member is also a member of the second social network; and
in response to determining that the first member is a member of the second social network, requesting member identification information for the first member on the second social network's member identification.

3. The method of claim 2, further comprising:
receiving, from the first member, the first member's member identification information for the second social network; and
requesting a list of one or more social contacts associated with the st member using the first member's member identification.

4. The method of claim 3, further comprising:
receiving a list of one or more social contacts associated with the first member from the second social network.

5. The method of claim 1, wherein the member sign-up notification is displayed on event wall web pages generated by the second social network associated with other members of the second social network as a post from the first member.

6. The method of claim 1, further comprising:
sending, to the first member, a request to select one or more members from a first list of one or more social contacts received from the second social network; and
receiving, from the first member, a second list of one or more social contacts selected by the first member.

7. The method of claim 6, wherein a second respective member is one of the social contacts selected by the first member.

8. The method of claim 1, further comprising:
receiving notification that a second respective member has clicked on a personalized referral link; and
in response to receiving notification that the second respective member has clicked on the personalized referral link, transmitting a personalized membership registration web page to the second respective member.

9. The method of claim 8, further comprising:
in response to receiving notification that the second respective member has clicked on the personalized referral link, deleting the comment from the first member's event wall web page.

10. The method of claim 8, further comprising:
in response to receiving notification that the second respective member has joined the first social network, deleting the comment from the first member's event wall web page.

11. A system comprising:
one or more computer processors; and
one or more computer-readable mediums storing instructions that, when executed by the one or more computer processors, cause the system to perform operations comprising:
receiving a member account sign-up request for a first social network, the request associated with a first member profile from a second social network, the first member profile representing a first member of the second social network;
posting a member sign-up notification to an event wall web page generated by the second social network based on information related to the first member profile, wherein the first member profile is connected to one or more member profiles associated with social contacts of the first member through the second social network; and
for at least a second respective member profile in the one or more member profiles associated with the social contacts of the first member:
posting a personalized invitation message as a comment to the member sign-up notification on the event wall web page associated with the first member profile, and
initially omitting display of the comment on the event wall web page generated by the second social network based on information related to the second respective member profile.

12. The system of claim 11, herein receiving a member account sign-up request for a first social network includes:
determining whether the first member is also a member of the second social network; and
in response to determining that the first member is a member of the second social network, requesting member identification information for the first member on the second social network's member identification.

13. The system of claim 12, the operations further comprising:
receiving, from the first member, the first member's member identification information for the second social network; and
requesting a list of one or more social contacts associated with the first member using the received first member's member identification.

14. The system of claim 13, the operations further comprising:
receiving a list of one or more social contacts associated with the first member from the second social network.

15. The system of claim 12, the operations further comprising:
sending, to the first member, a request to select one or more members from a first list of one or more social contacts received from the second social network; and receiving, from the first member, a second list of one or more social contacts selected by the first member.

16. The system of claim 15, wherein a second respective member is one of the social contacts selected by the first member.

17. The system of claim 12, the operations further comprising:
receiving notification that a second respective member has clicked on a personalized referral link; and
in response to receiving notification that the second respective member has clicked on the personalized referral link, transmitting a personalized membership registration web page to the second respective member.

18. The system of claim 17, the operations further comprising:
in response to receiving notification that the second respective member has clicked on the personalized referral link, deleting the comment from the first member's event wall web page.

19. The system of claim 11, wherein the member sign-up notification is displayed on event wall web pages generated by the second social network associated with other members of the second social network as a post from the first member.

20. A non-transitory computer readable storage medium storing one or more programs for execution by one or more processors, the one or more programs comprising instructions for:

receiving a member account sign-up request for a first social network, the request associated with a first member profile from a second social network, the first member profile representing a first member of the second social network;

posting a member sign-up notification to an event wall web page generated by the second social network based on information related to the first member profile, wherein the first member profile is connected to one or more member profiles associated with social contacts of the first member through the second social network; and for at least a second respective member profile in the one or more member profiles associated with the social contacts of the first member:
posting a personalized invitation message as a comment to the member sign-up notification on the event wall web page associated with the first member profile, and
initially omitting display of the comment on the event wall web page generated by the second social network based on information related to the second respective member profile.

* * * * *

UNITED STATES PATENT AND TRADEMARK OFFICE
CERTIFICATE OF CORRECTION

PATENT NO. : 9,832,162 B2
APPLICATION NO. : 15/237207
DATED : November 28, 2017
INVENTOR(S) : Cai et al.

It is certified that error appears in the above-identified patent and that said Letters Patent is hereby corrected as shown below:

In the Claims

In Column 17, Line 45, in Claim 3, delete "st" and insert --first-- therefor

In Column 18, Line 43, in Claim 12, delete "herein" and insert --wherein-- therefor Signed and Sealed this
Twenty-eighth Day of May, 2019

Andrei Iancu
*Director of the United States Patent and Trademark Office*